United States Patent [19]
Locke

[11] 4,419,714
[45] Dec. 6, 1983

[54] LOW INDUCTANCE CERAMIC CAPACITOR AND METHOD FOR ITS MAKING

[75] Inventor: Charles H. Locke, Poughkeepsie, N.Y.

[73] Assignee: International Business Machines Corporation, Armonk, N.Y.

[21] Appl. No.: 364,819

[22] Filed: Apr. 2, 1982

[51] Int. Cl.³ .................. H01G 4/34; H01G 13/00; H01L 1/02
[52] U.S. Cl. .................. 361/321; 29/25.42; 357/75
[58] Field of Search .................. 361/321; 357/14, 40, 357/75; 29/25.42

[56] References Cited

U.S. PATENT DOCUMENTS

| | | | |
|---|---|---|---|
| 3,388,302 | 6/1968 | McManus | 357/75 |
| 3,448,355 | 6/1969 | Ahearn et al. | 29/25.42 X |
| 3,962,713 | 6/1976 | Kendall et al. | 357/14 |
| 4,017,885 | 4/1977 | Kendall et al. | 357/51 |
| 4,029,531 | 6/1977 | Marinelli | 156/647 |
| 4,030,004 | 6/1977 | Rutt | 361/313 |
| 4,065,742 | 12/1977 | Kendall et al. | 338/9 |
| 4,074,340 | 2/1978 | Leigh | 361/321 |
| 4,328,530 | 5/1982 | Bajorek et al. | 361/308 |
| 4,389,703 | 6/1983 | Morel et al. | 361/321 X |

FOREIGN PATENT DOCUMENTS 1433677  4/1976  United Kingdom .............. 361/321

Primary Examiner—Donald A. Griffin
Attorney, Agent, or Firm—Joseph C. Redmond, Jr.

[57] ABSTRACT

Described is an improved common faced terminated multi-layer ceramic capacitor structure capable of embodying multiple capacitors of various maximum voltage and capacitance rating and method for its making. The structure features a ceramic body including multiple sections having a dielectric element and companion plate of one or more types, the types defined by the number and placement on the plate of plate tabs. The sections are aligned in the body such that the plates are located at displaced intervals in the direction of the body length while the plate tabs are located at displaced intervals in the direction of the body width and exposed at a common body face. Buses interconnect the tabs and plate in groups at common face. By selectively connecting the buses, one or more capacitors may be formed in the body. A structure is improved by providing grooves in the common face to align tabs in groups and to maintain the groups separated with the effect that the maximum voltage the structure can withstand is not reduced to mis-alignment of tabs during formation of the body. The method features steps for grooving the common face and simultaneously aligning tabs in the body.

24 Claims, 19 Drawing Figures

LOW INDUCTANCE CERAMIC CAPACITOR AND METHOD FOR ITS MAKING

DESCRIPTION

BACKGROUND OF INVENTION

This invention concerns a low inductance ceramic capacitor structure having multiple capacitor plates which are terminated at a common face and more particularly, an improved structure and method of its making wherein the plate terminations are aligned and isolated by grooves in the common face.

The continuing objective of data processing equipment designers is to produce equipment having increased operating speed, reduced physical size and lower manufacturing cost.

Designers seek this objective today by attempting to pack as many circuit devices as possible into the integrated circuit chips that go to make up the equipment. By packing as many devices as possible on a chip, the designer reduces the length of interconnections needed to join the devices which tend to slow circuit operation down, thereby enabling faster operation. Additionally, by increasing the number of circuit devices per chip, the designers eliminate previously unused space with the result that the physical size of the equipment is reduced. Finally, since the manufacturing cost per chip tends to be fixed, by fitting more devices on a chip, designers are able to reduce the manufacturing cost per device i.e., less chips are required for the same number of devices.

Efforts to produce more devices per chip have resulted in the so-called very large scale integrated circuit technology (VLSI) which today represents the state of the semiconductor art. This technology is capable of producing as many as 20,000 memory units and associated circuitry on a single chip or as many as 4,000 logic units and associated circuitry on a single chip.

Unfortuantely, however, VLSI and, in fact integrated circuits generally, have not been a complete answer for designers. Because of limitations associated with semiconductor materials and integrated circuit size, it has not been possible to conveniently build in an integrated form the full range of circuit elements the designer desires. While it is relatively simple to build transistors, diodes and even resistors, it has not proven convenient to build capacitors and inductances of the values typically required.

Capacitors are a particular problem. Where capacitance of other than a very low value are desired, the dielectric material constant and plate area available in integrated circuit form make such capacitors difficult or impossible to build.

To deal with this, designers have used discrete capacitors, i.e. capacitors separate from the circuit chip, to cooperate with the chip to form the full circuit. However, to retain the advantages of integrated form, the designers have sought discrete capacitors of small size, high speed and low cost.

A particular capacitor design found to be suitable for use with VLSI circuits is described by Chance et al in his co-pending application Ser. No. 164,119, filed June 30, 1980, assigned to the assignee of this application. The Chance et al structure is of small size, high speed and low manufacturing cost. The structure is of the laminated ceramic parallel plate type, and includes multiple capacitor sections, each having a ceramic dielectric layer which has been metallized to form a capacitor plate. The structure is formed to a desired size by combining the multiple sections.

The structure has low inductance and, therefore, high speed as well as small size because the capacitor plates are exposed at a common capacitor body face and joined by means of metallic strips which act as low inductance interconnection buses. To facilitate this construction, each capacitor plate is provided with one or more tabs which are spaced in the direction of the body width. The tabs thereafter are interconnected by means of the interconnect buses. Final connection of the capacitor structure to other circuit elements, for example the VLSI chips, is accomplished by flip-chip mounting the structure on a multi-layer ceramic substrate with the use of solder balls as also described in the Chance et al patent application above noted.

To make the Chance et al structure as small as possible, the lateral spacing of the plate tabs is reduced to a minimum. For example, the plate tabs are typically 4 to 8 mils in width spaced 7 to 10 mils apart.

Unfortunately, due to the small sizes involved it is difficult to properly locate the tabs and buses to avoid undesired interaction. Additionally, due to ceramic shrinkage in curing, it is common for the plate tab location to drift, further aggravating the mis-alignment. Because of these problems, minimal size for the capacitor structures has been difficult to attain.

SUMMARY OF THE INVENTION

It is therefore an objective of this invention to provide an improved common face terminated multi-layer ceramic capacitor structure of minimal size and a method of its making.

It is a further objective of this invention to provide an improved common face terminated multi-layer ceramic capacitor structure wherein the plate tabs and their interconnect buses are of minimal separation and method of its making.

It is yet a further objective of this invention to provide an improved common face terminated multi-layer ceramic capacitor structure wherein the corresponding tabs of like plates are aligned and separated from the tabs of other plate types and their interconnect buses and method of its making.

Briefly, the general capacitor structure to which my invention relates features a ceramic body of desired length, width and height which is made up of multiple capacitor sections. Each capacitor section is defined by a dielectric element which has been metallized at a major face to form a capacitor plate. In forming the body, the sections are combined such that the plates are located at displaced intervals in the direction of the body length. Each plate is provided with one or more tabs which are exposed at a common face of the body. This face thus defines a common terminating face for the structure. Additionally, the structure includes multiple individual buses in the form of metallic strips which are arranged to selectively interconnect the plate tabs in groups. By selectively interconnecting the buses, various groups of plates may be interconnected to form one or more parallel plate type capacitors of desired capacitance and voltage rating.

In accordance with my invention, the structure is improved to permit minimal tab and bus spacing by providing grooves in the common termination face to align tabs of particular tab groups and to separate them from the tabs and associated interconnect buses of other tab groups.

In one form of the invention, the structure is provided with multiple plate types, each plate type being defined by the number of tabs per plate and the location of the tabs on the plate. In this form, the plate tabs are exposed at the common face with the tabs of the various plate types displaced in the direction of the body width. Additionally, in this form, the plate types are varied in the direction of the body length. In accordance with my invention, the structure is improved by arranging the grooves such that the grooves align the corresponding tabs of like plate types in the direction of the body length while separating the tabs of unlike plate types and their associated interconnect buses in the direction of the body width. Additionally, with this configuration, the grooves are located at either side of the desired location of the plate tabs, in the direction of the body width, to define mesa structures which provided a boundary for corresponding plate tabs of like plate types. The result is that mislocated tabs are in effect aligned to their intended locations by trimming the misaligned portions.

In this preferred form of the structure, a layer of insulating material is provided atop the individual interconnect buses. Each such insulating layer includes one or more cavities having bases at which the respective interconnect buses are exposed. The cavities are configured to receive solder balls which contact the exposed bus and extend above the upper surface of the insulating layer so that the structure may be inverted and bonded to a suitable substrate in the well known flip-chip fashion. In this configuration, the patterned insulating layers act as a solder dam to confine the solder balls when they are flowed. In accordance with my invention, the insultating layers are made to extend laterally in the direction of the body width between the interconnect buses into the grooves which define the mesa structures to form a single layer that fully passivates the grooved common termination face.

In another preferred form of the invention, a frame in the shape of a metallic plate having aligned rectangular slots is positioned atop the common face of the structure. The frame is located on the structure to overhang the structure's perimeter and such that it is positioned atop and extends laterally beyond the width of individual interconnect buses while the slots are positioned generally above the grooves. In this form, the frame is bonded to the interconnect buses such that the frame's perimeter may be trimmed away to leave isolated frame sections atop and extending beyond the width of the interconnect buses. An additional layer is located atop the frame sections and patterned with cavities having bases at which the frame sections are at least partially exposed. As in other forms of the invention, the patterned layer acts as a solder dam to solder ball flow. The cavities are configured to receive solder balls which contact the exposed buses. As in the previous embodiment, the solder balls extend above the upper surface of the layer so the structure may be flip-chip mounted. In this form of the invention, the solder dam may be a patterned layer of either insulating or conducting material.

In yet another form of the invention, the structure is provided with a first layer of insulation over the grooved common termination face, the first insulating layer extending to a height above the upper surfaces of the mesas. In this form, the first insulation layer is patterned at the mesas' upper surfaces to receive the metallic interconnect buses for connection to the plate tabs.

In one version of the preferred embodiment, a further patterned metallic layer may be applied to the respective buses to act as a solder dam. In another version of this embodiment, a second layer of insulation is located atop the first insulation layer and the metallic interconnect buses to act as a solder dam. The solder dam layers are provided with one or more cavities having bases at which the buses are exposed. Again, the cavities are such as to receive solder balls which contact the exposed buses and extend above the upper surface of the solder dam so the structure may be flip-chip mounted to a suitable substrate.

A preferred method for making the improved structure in accordance with my invention includes the steps of first forming the capacitor body by combining capacitor sections which include dielectric elements and plates such that the capacitor plates are located at displaced intervals in the body. The plates are provided with one or more tabs displaced in the direction of the body width to define two or more plate types. Further, the tabs are exposed at a common termination face of the structure. Following formation of the body, a blanket layer of metallization is deposited at the common termination face so as to contact all tabs of all plate types. Following blanket deposition, grooves are cut in the blanket metallization and the common termination face. The grooves can be cut, for example, by ultrasonic grinding or sawing the common face. The grooves are cut to extend in the direction of the body length to pattern the metallization in strips and to align the corresponding tabs of like plate types. Additionally, the grooves extend in the direction of body width to isolate the buses and the tabs of unlike plate types. Following simultaneous formation of the buses and grooves, a layer of insulating material is deposited over the entire common face. Thereafter, cavities are patterned in the insulating layer in the region of the interconnect buses having bases at which at least portions of the buses are exposed. The insulating layer may be patterned using conventional masking and etching techniques. Finally, solder balls are added to the cavities so as to contact the metal buses and extend above the upper surface of the insulating layer.

In another preferred method of making the structure, following the formation of the capacitor body, and after formation of the interconnect buses and grooves a metallic frame having rectangular slots therein is bonded at the upper surface of the interconnect buses. As mounted, the frame perimeter extends beyond the perimeter of the capacitor body while the frame body extends beyond the lateral extent of the buses. The frame slots are located above the grooves of the common face. Following bonding of the frame to the buses, the perimeter of the frame is cut away to leave isolated sections of the frame bonded atop the buses and extending beyond their widths. After the frame is trimmed, solder dams are applied to the isolated frame sections. The solder dams, as noted above, may be layers either of insulating or conductive material patterned with cavities having bases at which the respective frame sections are exposed. Convenient photolithographic techniques may be used to deposit the solder dams and provide the cavities in them. Finally, the cavities are provided with solder balls which contact the frame and extend above the upper surface of the solder dam layer.

Alternatively, the solder dams may be prepared on the frame before the frame is bonded to the capacitor body.

In a yet further preferred method of making the improved structure, following formation of the body, and before the common face is metallized, grooves are cut in the common face again to align corresponding tabs of like plate types in the direction of the body length while separating plate tabs of unlike plate type in the direction of the body width. Thereafter a first layer of insulation is provided atop the common face so as to fill the grooves and extend above the height of the mesa structures. Next, the first insulating layer is planarized and contoured using standard techniques so as to expose the upper surface of the mesa structures. Subsequently, a layer of metallization is deposited at the surface of the mesa structures to form the interconnect buses. After deposition of the interconnect buses, the first insulation layer and the bus surfaces are again planarized and a solder dam layer deposited. The solder dam layer is thereafter patterned to form cavities having bases at which the interconnect buses are at least partially exposed. Finally, solder balls are provided in the cavities in contact with the buses and extending above the upper surface of the solder dam layer. As noted, the solder dam layer may be either a conductive layer deposited only over the interconnect buses or a second insulating layer deposited over the entire first insulation layer and the buses.

These and other objectives and advantages of the present invention will be more clearly understood when considered in connection with the accompanying drawings in which:

FIGS. 6A–6D are views of a further embodiment of the improved structure in accordance with this invention.

DETAILED DESCRIPTION OF INVENTION

Figure 1:
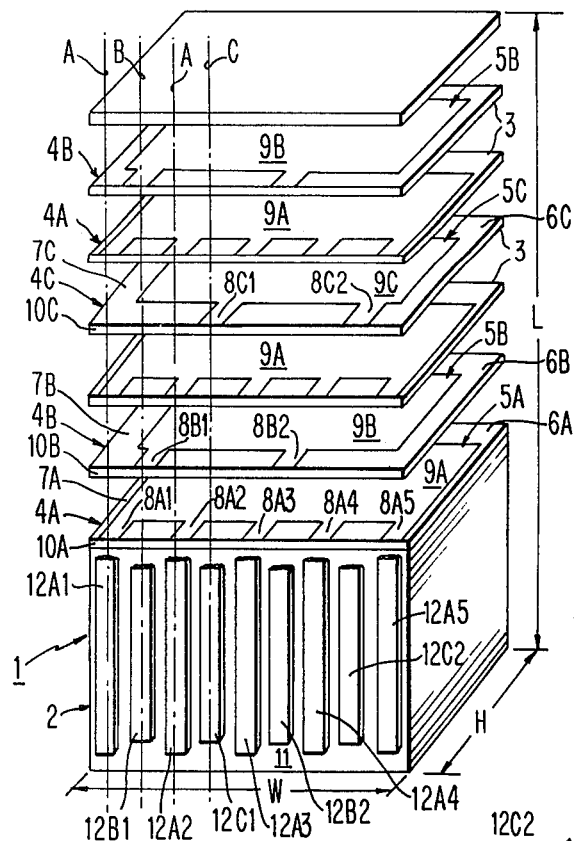
FIG. 1 is an exploded isometric view of the capacitor structure as previously known.

A low inductance ceramic capacitor structure suitable for use with VLSI semiconductor chips is described by Chance et al in their co-pending U.S. Pat. application Ser. No. 164,119, entitled "A Multiple Layer Ceramic Carrier For High Switching Speed VLSI Chips". FIG. 1 is an illustration of that structure.

As shown, capacitor structure 1 is defined by a body 2 of generally rectangular cross section having width W, height H and length L. While body 2 is shown rectangular in cross section, it will be appreciated that for convenience of use it may take other forms as well, as for example a circular cross section. Body 2 is seen in FIG. 1 to be composed of a plurality of body sections 3. Sections 3 include dielectric elements in the form of dielectric sheets 4A, B, C of desired length, width and thickness. As shown, sheets 4A, B, C are of substantially equal size i.e., length, width and thickness. By virtue of the construction of body 2, its width and height correspond to the width and height of sheets 4A, B, C while the length of body 2 corresponds to the combined thickness of elements 4A, B, C. To maximize structure 1's capacitance per unit size dielectric sheets 4A, B, C are made of a high dielectric constant material, as for example, barium titanate $BaTiO_3$ or the like.

Body sections 3 also include capacitor plates 5A, B, C in the form of layers of metallization respectively located on principal faces 6A, B, C of dielectric sheets 4A, B, C. Plates 5A, B, C are respectively located generally centrally of faces 6A, B, C and displaced from perimeters of sheets 4A, B, C by boundaries 7A, B, C. In preferred form, plates 5A, B, C are of substantially equal areas. As seen in FIG. 1, plates 5A, B, C are respectively provided with groups of plate tabs 8A, B, C which extend from a groups of plate tabs 8A, B, C which extend from a main plate sections 9A, B, C to edges 10A, B, C of sheets 4A, B, C.

As will be described more fully hereinafter, in preferred form the plates of structure 1 are of different types to enable formation of multiple individual capacitors of different capacitance and voltage rating. As shown, structure 1 has three types of plates, 5A, 5B and 5C to facilitate formation of capacitors having two different capacitative and voltage ratings. In this arrangement, the plate types are defined by the number of tabs per plate and their location on the plate. Particularly tab group 8A includes tabs 8A1 to 8A5 while group 8B includes 8B1, 8B2 and group C includes tabs 8C1, 8C2. The tabs of particular groups are located such that they are displaced from one another in the direction of the width of sheets 4 which is the direction of body 2's width.

As shown, body 2, sheets 4A, B, C, plates 5A, B, C and tabs 8A, B, C are generally rectangular in cross section in order to provide efficient use of space. It will be appreciated that if the cross section of body 2 were other than rectangular, the shape of sheets 4A, B, C, plates 5A, B, C and tabs 8A, B, C, could also be varied as desired. Plates 5A, B, C and associated tab groups 8A, B, C may be, for example, layers of silver paste which have been screened onto faces 6A, B, C in a conventional manner.

As seen in FIG. 1, the plate tabs of the various plate types extend respectively to edges 10A, B, C of sheets 4A, B, C. Additionally, edges 10A, B, C are aligned such that as the sheets are combined edges 10A, B, C combine to form a common face 11 of the body at which the plate tabs are exposed. With further reference to FIG. 1, the plate tabs of various plate types are located on their respective sheets 4A, B, C such that when the sheets are combined the tabs of particular plate types align between the plate tabs of other plate types in the direction of the body width. Particularly, plate type A is provided with 5 tabs, 8A1 to 8A5, equally spaced over the width of its corresponding sheet 4A. Plate type B is provided with two tabs 8B1 and 8B2 positioned on its respective sheet 4B such that when combined with sheet 4A, tab 8B1 lies between tabs 8A1 and 8A2 and tab 8B2 lies between tabs 8A3 and 8A4. Similarly, plate type C is provided with two tabs 8C1 and 8C2 positioned on its respective sheet 4C so that when combined with sheets 4A, 4B, tab 8C1 lies between tabs 8A2 and 8A3 and tab 8C2 lies between tabs 8A4 and 8A5.

To facilitate formation of capacitors within body 2, interconnect bus groups 12A, B, C are provided at common face 11 of body 2. In accordance with the Chance et al structure shown in FIG. 1, the interconnect buses are arranged to connect corresponding plate tabs of like plate types. Accordingly, buses 12A1, 12A2, 12A3, 12A4 and 12A5 are provided at face 11 running the length of body 2 to interconnect plate tabs 8A1 through 8A5 of plate type A. Additionally, buses 12B1 and 12B2 are provided at face 11 running the length of body 2 to interconnect plate tabs 8B1 and 8B2 of plate types B and buses 12C1 and 12C2 provided at face 11 running the length of body 2 to interconnect plate tabs 8C1 and 8C2 of plate type C.

Like the plate tab, bus groups 12A, B, C are arranged at common face 11 spaced at intervals in the direction of the body width W. Also, as the plate tabs of various plate types were located between the tabs of other plate types, so, too are the buses for particular plate types so located. Particularly, bus 12B1 is located between bus 12A1 and 12A2, bus 12C1 between 12A2 and 12A3, bus 12B2 between 12A3 and 12A4 and bus 12C2 between 12A4 and 12A5 as measured in the direction of the body width.

With this construction, capacitor sub-units are formed by variously connecting the tabs of the various plate types such that one or more dielectric elements are sandwiched between two capacitor plates. Since the capacitor sub units are of the parallel plate type, the capacitance per sub-unit is in accordance with the well-known expression:

$$C = \xi(A/L)$$

where C is the capacitance, A the area of the plates, L the thickness of dielectric between plates and $\xi$ the constant of the dielectric. Therefore, for a given dielectric constant, as the area of the capacitor plates increases, the capacitance increases and as the distance between plates increases, the capacitance decreases. Where the subunits are connected in parallel, as would be the case here, the total capacitance for the structure would then be equal to the sum of the capacitance of the individual subunits.

Additionally, for a parallel plate capacitor, the maximum voltage the capacitor can withstand is determined by the expression:

$$V = D \cdot t$$

where V is the maximum voltage the structure can withstand without rupturing, D the dielectric strength of the dielectric material and t the thickness of the dielectric between plates. As this expression shows, with increases in dielectric thickness, the maximum voltage the capacitor can withstand is increased. Accordingly, for structures shown in FIG. 1, the maximum voltage rating is dependent upon the thickness of dielectric between active plates.

As noted, for structure 1, three different plate types are provided. Additionally, the plate types are located at spaced intervals in the direction of the body length having a sequence A, B, A, C, A, B, etc. With this arrangement, two different capacitances of two different voltage ratings may be formed where corresponding plate tabs of like plate type are interconnected.

A capacitor of first capacitance and voltage rating can be formed by treating plate types A and B together and a second capacitor by treating plate types A and C together. Based on the placement of the plate types a capacitor utilizing plate types A and B in parallel fashion would have a first capacitance and voltage rating and a capacitor utilizing plate types A and C in a similar fashion would have a second capacitance rating equal to one-half the capacitance of unit AB, but having a voltage rating of twice that of unit AB. As explained above, where plate area and dielectric material remains constant, voltage rating increases proportionally and capacitance rating decreases inversely proportionally as the distance between plates is increased. As seen in FIG. 1, the distance between plate types A and B is one unit, i.e., one thickness of sheet 4. The distance between plate types A and C is two units, i.e., two thicknesses of sheet 4. Accordingly, where equal number of plates are connected in the AB and AC capacitor, only the distance between plates is different with the results noted. It has been found that the presence of a B-type plate in the AC capacitor dielectric has no appreciable adverse affect where the B plate is electrically isolated from the circuit that utilizes the AC capacitor. It should also be noted that where a capacitor could be defined by combining plates BC, it would be of values equal to those of AB, i.e., one unit of dielectric thickness. Additionally, since in accordance with a Chance et al structure, it is preferred to connect all like plate types together, no consideration is given here to capacitors which might be formed by selectively arranging like plate types to form a capacitor e.g., AA, BB, CC or by omitting certain corresponding tabs of like plate types to vary dielectric thickness.

Final formation of the variously rated capacitors is accomplished by mounting capacitor structure 1 on a multi-layer ceramic (MLC) substrate (not shown). The MLC substrate contains the wiring elements necessary to connect the various capacitor buses to the integrated circuits to which structure 1 is to be coupled. For the details of the MLC substrate and the coupling of structure 1, reference should be made to the Chance et al application above noted.

Figure 2:
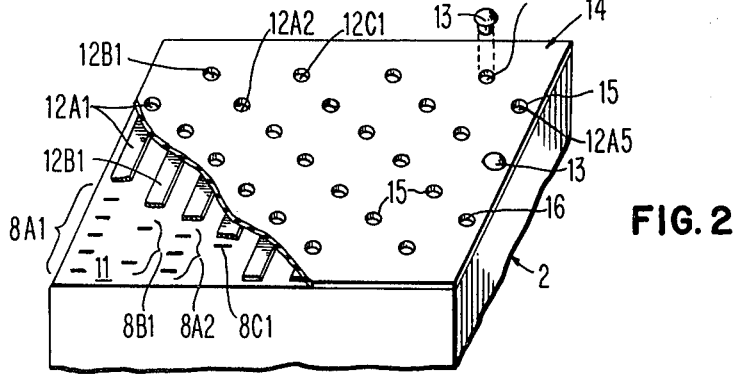
FIG. 2 is a cut-away isometric view of the capacitor structure as previously known.

To facilitate mounting on the MLC substrate, structure 1, is provided with solder balls 13 as shown in FIG. 2. Solder balls 13 are arranged at structure 1's common face 11 to electrically connect buses 12A, B, C, to the interconnect pattern of the MLC substrate. Additionally, to confine solder flow when structure 1 is joined to the MLC substrate, a solder dam in the form of a layer 14 is provided at common face 11. Layer 14 is made of a material which will not wet, i.e., stick to the solder ball, for example, a layer of polyimide which has been applied to face 11 in a conventional manner.

As seen in FIG. 2, layer 14 is patterned to include an array of cavities 15 which extend through the layer to expose the underlying interconnect buses 12A, B, C at cavity bases 16. The pattern of cavities 15 in layer 14 is termed the structure's "foot print" and is designed to place the solder balls at the proper location on the MLC substrate to correctly interconnect it. The cavities 15 may be patterned in layer 14 using conventional masking and etching techniques. In preferred form the so-called lift-off process as defined in U.S. Pat. No. 4,004,044, Franco et al is used.

As explained in the Background remarks, to retain the size, speed and low cost advantages of VLSI integrated circuit chips, designers have sought to make discrete capacitors for use with such chips, also of small size and capable of high speed operation. To this end, Chance et al in their above-noted application proposed the multi-layer common face terminated capacitor structure shown in FIGS. 1 and 2 and described above. However, and as also pointed out above, practical difficulties are encountered in realizing the full reduction in size possible with the Chance et al structure.

Particularly, to maximize size reduction, designers have sought to make the width of the plate tabs as measured in the direction of body 2's width as small as possible and to locate the plate tabs as closely together in the direction of body 2's width as possible. These reductions in size and spacing of plate tabs has been sought so as to minimize the width of structure 1.

Unfortunately, however, as the width and spacing of tabs is reduced, it becomes difficult to position the tabs and interconnect buses to avoid points of close proximity at which the breakdown voltage would fall below that for the plate dielectric. Where the spacing between tabs of one plate type and buses of another plate type is equal to or less than the thickness of dielectric between the capacitor plates, the breakdown voltage of the unit becomes the voltage which that point of proximity can sustain. If corresponding plate tabs of like plate types are not in alignment in the direction of the body length, when the buses of one plate type are formed, it is possible for them to come into close proximity to one or more tabs of another plate type causing the maximum operating voltage, for the structure to be less than the capacitor dielectric thickness is capable of providing.

Plate tab misalignment arises from several sources. It has been found difficult to precisely locate plate tabs on their respective dielectric sheets and to thereafter combine the sheets so that in the unfired state, the plate tabs of corresponding types are aligned in the direction of the structure's length. This problem is further aggravated by shrinkage of the structure when the green ceramic is fired. During firing it is common for the structure to experience irregular shrinkage in all dimensions. This shrinkage is substantially uncontrollable and gives rise to further misalignment of the tabs. Additionally, due to precision limitations in the process for forming the interconnect buses at common face 11, it has been found difficult to precisely locate the interconnect buses at the center line for the corresponding plate tabs of like plate types. This results in skewing of the buses to one or the other side of the designed tab center lines.

The difficulties associated with alignment are better appreciated when it is realized that the typical tab width ranges from 4 to 7 mils while the distance between tab centers of alternating plate types is on the order of 8 to 10 mils. Additionally, the width of the shorting bar in preferred form typically ranges from 5 to 7 mils. When it is realized that the diameter of a human hair is approximately 15 mils, it is appreciated that the tabs and shorting bars are on the order of $\frac{1}{3}$ the width of a human hair and that accordingly their location and alignment can represent a significant problem.

Figure 3:
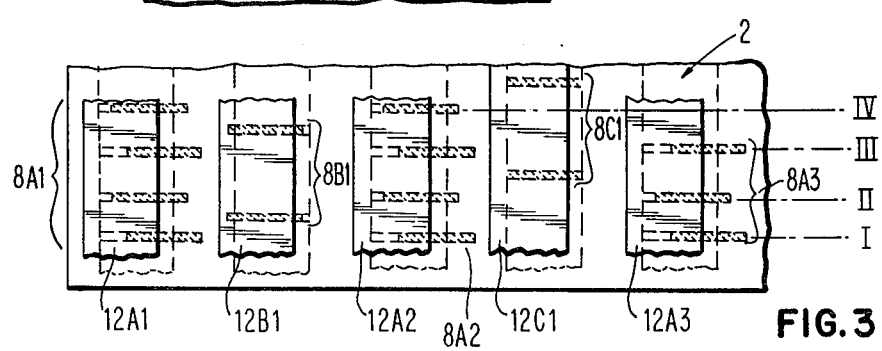
FIG. 3 is a fragmented top view of the capacitor structure as previously shown.

FIG. 3 is a top view of a fragmented section of structure 1 in which misalignment of plate tabs causing reduced voltage rating is illustrated. As shown in FIGS. 1 and 3, plate tabs 8A, B, C of respective plate types 5A, B, C are spaced in alternating sequence in the direction of body 2's width, while plate types 5A, B, C are shown located in alternating sequence in the direction of body length. The successive rows of plate types located in the direction of the body length have been designated I to IV. Also shown in FIGS. 1 and 3 are interconnect buses 12A, B, C extending in the length of the body length L to respectively interconnect tabs 8A, B, C.

In FIG. 3, the design positions for tabs and buses are shown in phantom while the misaligned actual position of tabs and buses is shown in solid lines. As seen in FIG. 3, where the tabs and buses are skewed from their design positions, the distance between tabs of one plate type and buses of another plate type can be less than the thickness of dielectric between the capacitor plates. Examples of this are shown in rows designated I and III. Particularly, in row I, tab 8A1 is proximate to bus 12B1 and in row IV tab 8A2 is proximate to bus 12C. As shown, the distances between the A plate tabs and the B and C buses are less than the thickness of dielectric between the AB and AC plate combinations. The result is the maximum operating voltage of the AB and AC capacitors would be reduced. To avoid potential reduction in maximum operating voltage arising from tab and bus misalignment, it is the teaching of this invention to provide grooves in the capacitor body's common termination face to align and separate the tabs and buses of the various plate types.

Figure 4:
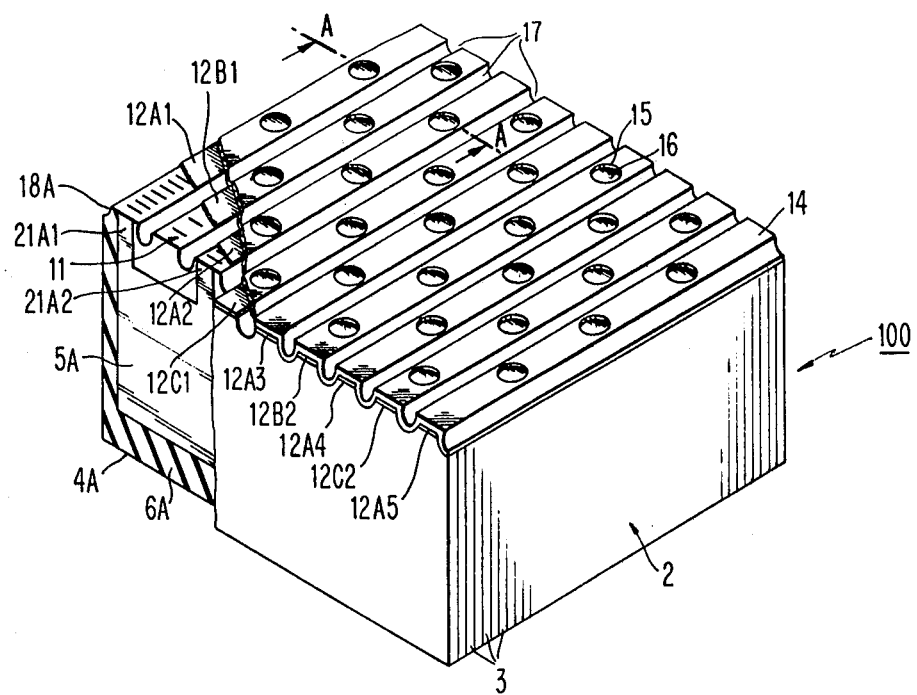
FIG. 4 is a cut-away isometric view of the improved structure in accordance with this invention.

An illustration of the improved structure in accordance with the invention is shown in FIG. 4. As shown, the elements of the improved structure that correspond to the Chance et al structure of FIGS. 1 and 2 are identified with like numerals. Accordingly, the improved structure 100 is defined by a body 2 comprised of multiple sections 3. Sections 3 including insulating sheets 4A, B, C, respectively having principal faces 6A, B, C upon which capacitor plates 5A, B, C are centrally located. As shown, plates 5A, B, C are respectively provided with tabs 8A, B, C. As in the case of the previously known structure, plates 5A, B, C of the improved structure are provided with multiple tabs, the number and location of which define the respective plate types. As in the earlier structure, the plate types are spaced in alternating sequence in the direction of the body length and the tabs of the respective plate types alternately spaced in the direction of the body width. Again, as in the previously known structure, plates 5A, B, C and sheets 4A, B, C are aligned and combined to define a common termination face 11 at which all the plate tabs are exposed.

In the case of improved structure 100, common face 11 is provided with grooves 17 located between the tabs of unlike plate types in the direction of the body width. As best seen in FIG. 4, grooves 17 extend the entire length of body 2. Further, grooves 17 are dimensioned so as to fill the space between the tabs of unlike plate types as measured in the direction of the body width. By arranging grooves 17 in this fashion, they interrupt and eliminate portions of plate tabs which are skewed from their design positions. Accordingly, since grooves 17 run the length of body 2, they act to align remaining portions 21A, B, C, of corresponding tabs 8A, B, C, in the direction of the body width. Grooves 17 thus act to reduce the width of tabs 8A, B, C which have skewed. Accordingly, grooving is effective where tab skewing is less than the tab width. In this regard, to extend the range of effectiveness of grooving, it is a further feature of this invention to increase the width of plate tabs 8A, B, C beyond that which would otherwise be used. In this way a tab remnant of adequate width may be found within the design tab boundaries. Stated otherwise, where the tab width is widened, greater amounts of drift can be corrected. There is, however, a limit both to the ability for grooving to correct drift and for the enhancement effect of increased tab width. Particularly, where tab drift extends so far in the direction of body width as to intercept the design boundary for the tabs of the adjacent plate type, the drift cannot be corrected. Because the groove is located and dimensioned to remove only material between the design tab locations, if the tab of one plate type drifts into the normal boundary of another plate type, a portion of the drifted tab will remain within the adjacent plate tab boundary after grooving. Accordingly, when the tab remnants are interconnected, the drifted tab remnant will remain to short the capacitor structure.

A further consideration for groove dimensioning is that the groove width be sufficient so that the maximum voltage the groove can withstand is in excess of the voltage which the dielectric thickness between plates can withstand. Groove width may vary depending upon the nature of insulation which is used to face it. For example, where a groove is left uncovered, the resulting air dielectric for a given groove width would have a first maximum withstanding voltage. If the groove were coated with an insulating material such as polyimide having a higher dielectric strength, the maximum withstanding voltage for the same width groove would be higher. Accordingly, groove width may be reduced if the dielectric strength of the insulating medium is increased.

Because potential reduction in maximum operating voltage arises from proximity of plate tabs to interconnect buses, the greatest sensitivity is experienced at the surface of common face 11 where the buses are located. Accordingly, groove depth is not critical provided it is of sufficient dimension as to remove the proximity of exposed plate tab and the nearest bus of a dissimilar plate type. In preferred form, the depth of grooves 17 is dimensioned to be approximately equal to its width.

Since grooves 17 are located to either side of the design position of the plate tabs, a mesa structure 18A, B, C for the respective plate tabs 8A, B, C is created when the grooves are formed. Mesas 18A, B, C so created define boundaries in the direction of the body width for their respective plate tabs 8A, B, C. That is to say as the grooves interrupt and terminate the lateral extent of the plate tabs, they thereby align corresponding tabs of like plate tabs in the direction of the body length. Further, this alignment establishes the remnant 21A, B, C of the respective plate tabs within the nominal boundaries on face 11 intended by the designer.

Figure 5A:
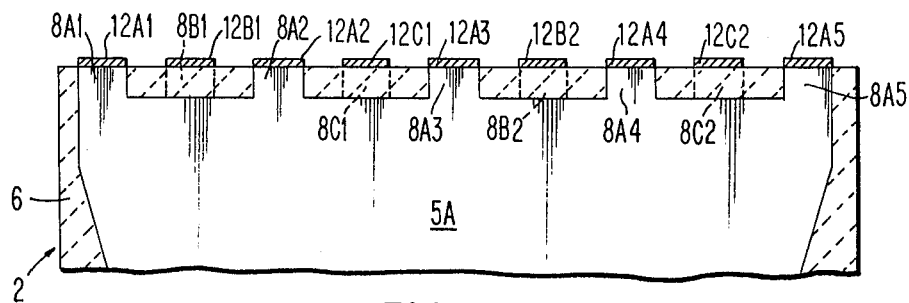
FIGS. 5A–5D are cross-sectional views of successive phases in the formation of one form of the improved structure in accordance with this invention.
Figure 5B:
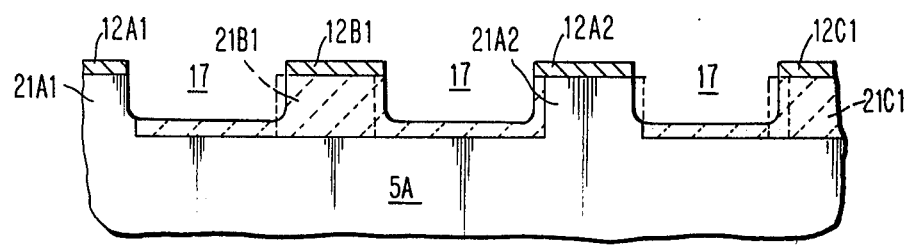
Figure 5C:
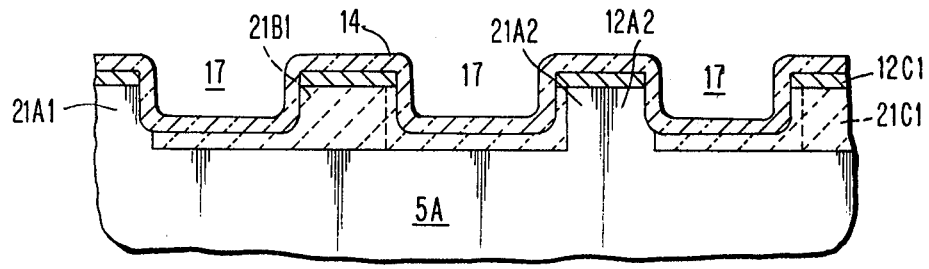
Figure 5D:
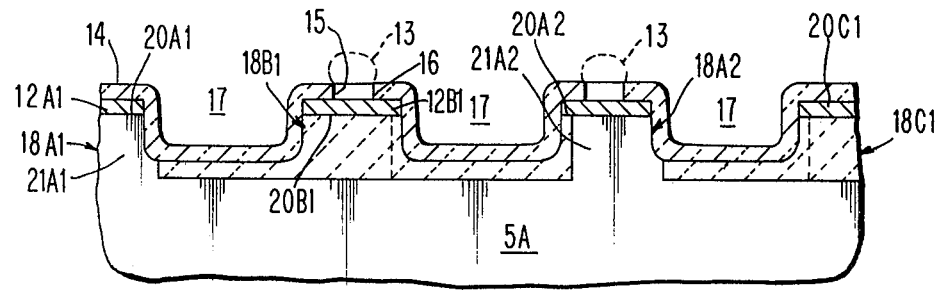

Mesas 18A, B, C have respective upper surfaces 20A, B, C at which remnants 21A, B, C of plate tabs 8A, B, C are exposed as seen in FIGS. 4 and 5d. Atop surfaces 20A, B, C and in connection with the tab remnants 21A, B, C, busses 12A, B, C are respectively located.

In a preferred form of the invention, a solder dam a medium not solder wettable in the form of a layer of insulation 14 is provided over common termination face 11 covering grooves 17 and bus groups 12A, B, C. As in the case of the previously known structure, the insulation layer 14 may be, for example, a layer of polyimide which has been applied in a conventional manner. Again as in the case of the previously known structure layer 14 is patterned, using conventional techniques, with cavities 15 located over buses 12A, B, C, the cavities having bases 16 at which the respective buses are exposed. Cavities 15 are contoured to receive solder balls 13 to confine solder flow when structure 100 is mounted to an MLC substrate. As in the previously known structure, the pattern of cavities 15 in layer 14 is designed to properly couple the respective buses 12A, B, C and their plate types 5A, B, C to the MLC substrate so that the capacitor units may be fully formed.

FIG. 5d is a cross section of structure 100 taken through A—A of FIG. 4 and shows mesas 18A1, B1, A2 and C1. As seen there, tab remnants 21A1, A2 are exposed at mesa surface 20A1, A2 respectively in contact with buses 12A1, A2. Also seen in FIG. 5d solder dam layer 14 covers surface 11 and buses 12A1, B1, A2 and C1. Buses 12A1, A2 are, however, partially exposed at bases 16 of cavities 15 where they are contacted by solder balls 13. As further seen in FIG. 5d, solder balls 13 extend above that upper surface of layer 14. As noted, cavitied layer 14 acts as a dam to solder flow when structure 1 is mounted to a substrate.

Figure 6A:
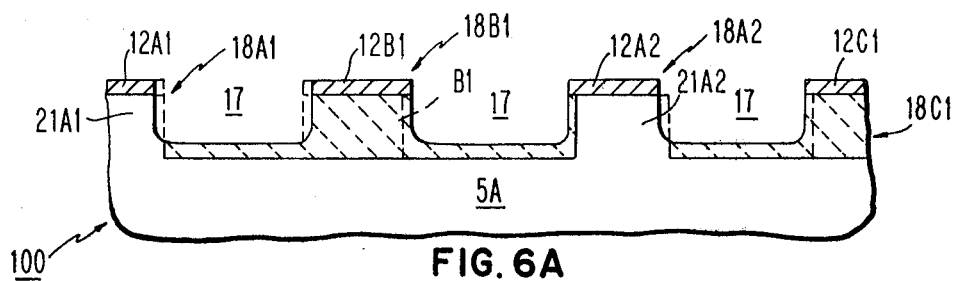
Figure 6B:
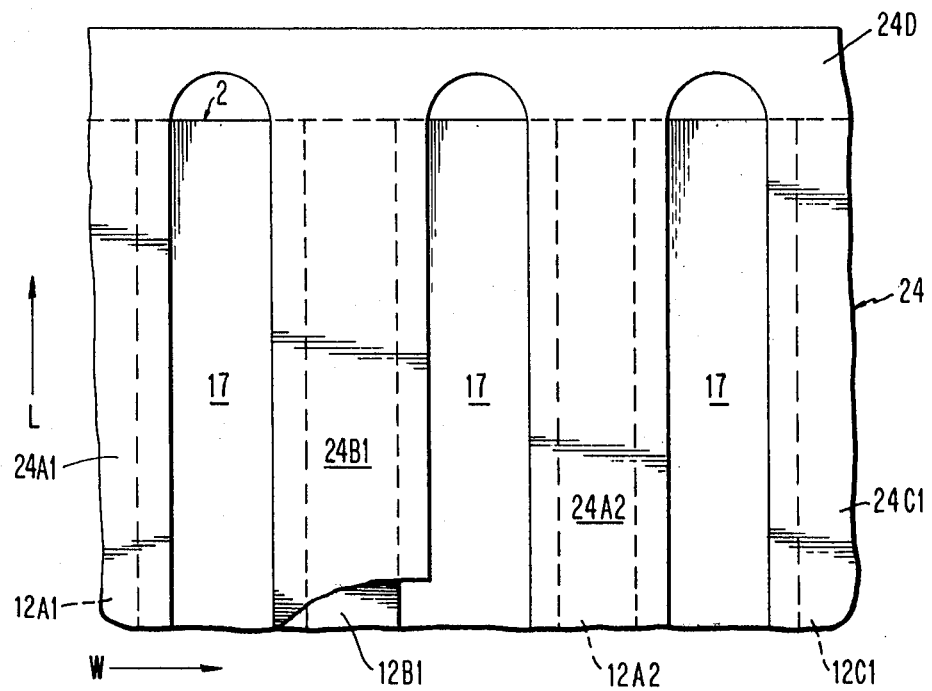
Figure 6C:
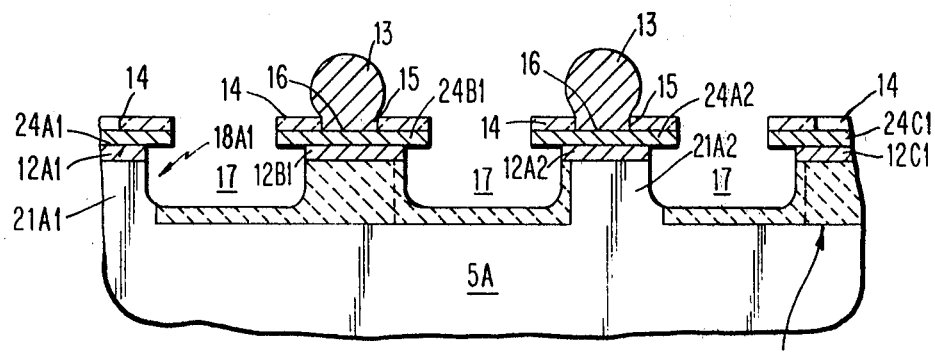

A further preferred form of the invention is shown in FIGS. 6a–c. Again, like elements are designated with like numerals. In the case of the embodiment shown in FIGS. 6a–c, a lead frame 24 is provided to form a broadened base for supporting the structure's solder dam. Where tab width and spacing is reduced to compress the width of structure 100, it is desirable to provide a broadened base atop buses 12A, B, C to accommodate the solder dam for solder balls 13. Additionally, such a frame facilitates ease of handling and alignment to the reduced size mesas 18A, B, C.

In preferred form, lead frame 24, shown in fragmented in FIG. 6b, is of generally rectangular shape having a length L, width W and thickness T, and is mounted atop common face 11 of structure 1. Lead frame 24 is a flat plate having a series of generally rectangular slots 25 spaced at intervals in the direction of the frame width and extending in the direction of the frame length. Slots 25 are centered in frame 24 in the direction of the frame length and are dimensioned so that their length does not exceed frame 24's length. Accordingly, an apron 24D is defined in the region of frame 24's parameter. By virtue of the spacing of slots 25 in the direction of frame 25's width, frame elements 24A, B, C are defined in the body of frame 24. Frame elements 24 A, B, C, are thus joined by frame apron 24D.

In assembly, frame 24 is mounted on common face 11 such that frame elements 24A, B, C are positioned atop and centered on buses 12A, B, C respectively, while slots 25 are centered over grooves 17 as best seen in FIG. 6c. Frame elements 24A, B, C are dimensioned so as to be approximately 50% wider than mesas 18A, B, C and companion buses 12A, B, C. As a result, when centered on buses 12A, B, C, elements 24A, B, C respectively extend into grooves 17 bounding mesas 18A, B, C. Since frame elements 24A, B, C are dimensioned to extend beyond the width of buses 12A, B, C respectively, slots 25 are accordingly sized in width to be less than the width of slots 17. In preferred form, slots 25 are dimensioned to be approximately equal to 50% of the width of slots 17 and to be of a length of approximately 10% longer than the length of structure 1's body 2.

Frame element 24 may be made of a copper alloy, the alloy depending upon the physical and electrical characteristics desired, and is bonded to buses 12A, B, C in any convenient manner as, for example, by brazing or high temperature lead-tin solder which has a melting point in excess of that for solder balls 13.

Once frame 24 is bonded to structure 1, frame apron 24D may be trimmed so as to leave frame elements 24A, B, C independent and disconnected. Thereafter, and again with reference to FIG. 6c, a solder dam layer 14 i.e., non-solder metal is applied to the frame section and subsequently patterned with conventional techniques to form cavities 15 having bases 16 at which the frame elements are exposed, similar to other embodiments, for receiving solder balls 13. The solder dam material may be either an insulating layer such as polyimide or a metallic layer as for example, chromium. Solder balls 13 are provided in cavities 15 such that they contact lead frame elements 24A, B, C and extend above the upper surface of insulating layer 14 with this arrangement structure 1 may be mounted to a substrate as described.

As an alternative to forming the solder dam after frame 24 is mounted, the solder dam layer 14 may be formed on the lead frame prior to bonding the frame to the capacitor body. With this alternative, the solder dam must be selected to withstand the process for bonding the frame to body 2.

A yet further embodiment of the invention is shown in FIGS. 7a–g. Again, as in the case of the previously described embodiments, common elements are designated similarly. In the preferred embodiment shown in FIGS. 7a–g, the structure is provided with grooves 17 and mesas 18A, B, C similar to those of the previously described embodiments. In the case of the embodiment shown in FIGS. 7a–g, however, a first layer of insulation 26 is shown deposited over the common face 11. First insulating layer 26 is arranged so as to fill grooves 17. Insulating layer 26, however, is patterned in the region of mesas 18A, B, C so that the upper surface 20A, B, C of the respective mesas are exposed and may receive metallization for formation of buses 12A, B, C. As in the case of other embodiments, buses 12A, B, C at mesa tops 20A, B, C make contact with the remnants of plate tabs 21A, B, C located within the boundary of the respective mesas.

Figure 7A:
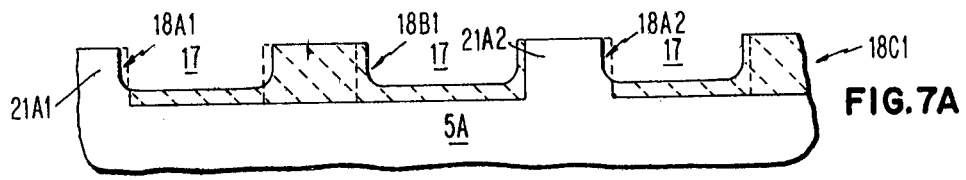
FIGS. 7A–7G are cross-sectional views of successive phases in the formation of a yet further form of the improved structure in accordance with this invention.
Figure 7B:
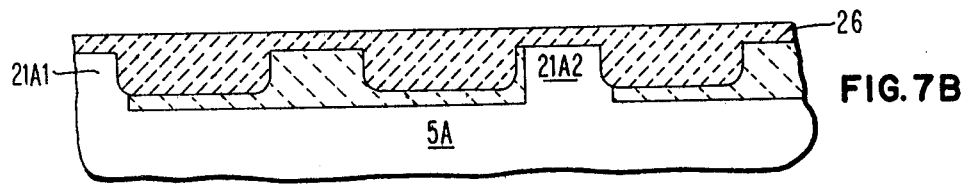
Figure 7C:
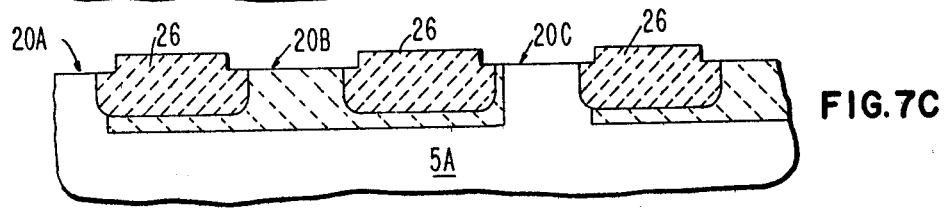
Figure 7D:
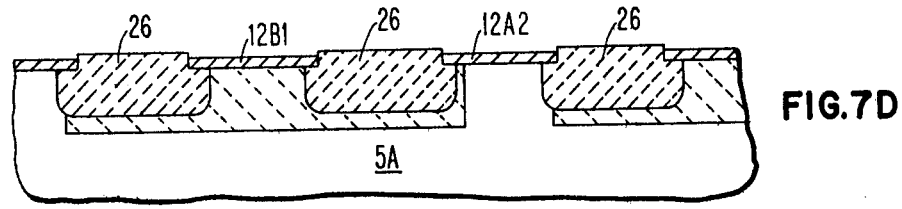
Figure 7E:
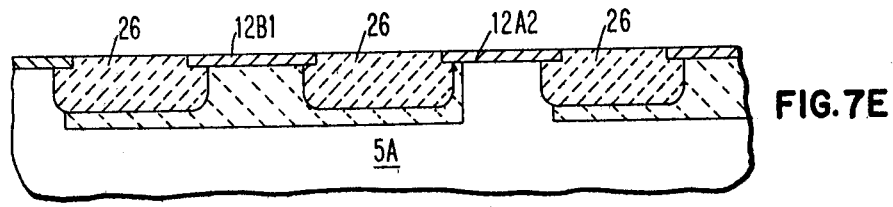
Figure 7F:
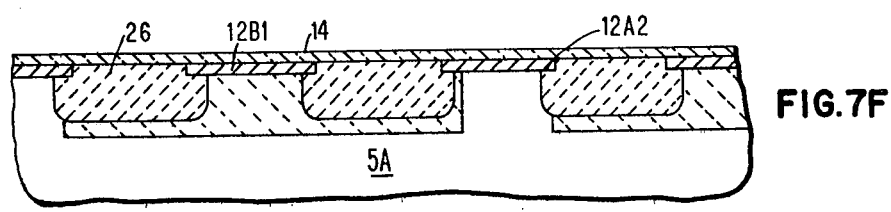
Figure 7G:
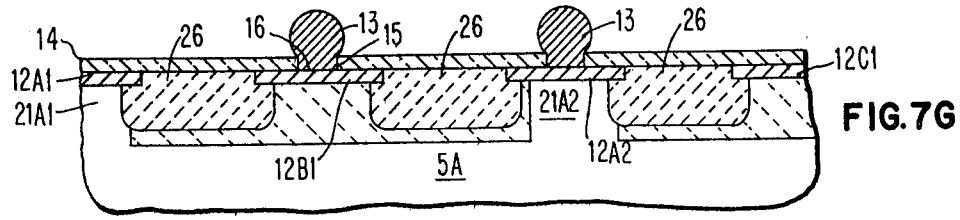

As seen in FIG. 7g, structure 100 has a solder dam layer 14 i.e., non-solder metallic layer as for example a second insulating layer applied in a conventional manner located atop first insulating layer 26 and interconnect buses 12A, B, C. As in the case of other embodiments, solder dam layer 14 is patterned using conventional techniques to include cavities 15 having bases 16 at which the interconnect buses 12A, B, C are exposed. The form of the cavities are such as to receive solder balls 13 which while contacting interconnect buses 12A, B, C extend above the upper surface 29 of the solder dam layer 14 so that the structure may be mounted to a MLC substrate. Solder dam layer 14 may also be a metallic layer, which is patterned with cavities and confined to be atop respective interconnect buses 12A, B, C.

For the preferred embodiment shown in FIGS. 7a–g, the first insulating layer may be, for example, silicon dioxide established in grooves 17 by any deposition process as for example sputtering. Second insulating layer 14 may be, as in the case of the previously embodiment, a layer of polyimide applied conventionally which has been patterned using conventional masking and etching techniques while the metallic solder dam layer could be chromium patterned using conventional techniques.

In accordance with this invention, there are preferred methods for making the described embodiments. In the case of the embodiment shown in FIGS. 6a to d, the preferred method of making this structure would include the steps of first forming the capacitor body; thereafter blanket depositing a layer of metallization at the common face 11; next forming grooves 17 in common face 11 so as to align corresponding tabs 8A, B, C of like plate types 5A, B, C in the direction of the body length and to simultaneously define mesas 18A, B, C, and interconnect buses 12A, B, C; next forming a solder dam as a layer of insulation at base 11 so as to cover the surfaces of grooves 17 and buses 12A, B, C; subsequently patterning insulating layer 14 to form cavities 15 over buses 12A, B, C having bases at which the buses are exposed and thereafter depositing solder balls 13 in cavities 15 so that the solder balls make contact with the respective buses 12A, B, C and extend above upper surface 14.

More particularly, body 2 of the embodiment shown in FIGS. 6a to d may be formed by preparing sheets of "green" i.e., unfired ceramic material as for example barium titanate in a conventional manner. Following formation of the sheets, capacitor plates may be applied by screening a layer of metallic paste for example silver of desired pattern and dimension on the sheets in the known manner. Thereafter, capacitor sections of desired pattern and dimension having the plate formed thereon may be punched from the sheets, oriented as desired and combined with one another under the application of heat and pressure to form a cured body 2.

Alternatively, the capacitor body may be formed by pouring successive layers of ceramic slurry into a mold of desired width and height, dried and thereafter supplied with metallic plate using, for example, screening techniques. Successive layers would be formed in this manner until a desired length for the structure is attained. Thereafter, the combined layers would be fired to form the cured body.

It is to be noted that the above-described methods for forming the ceramic capacitor body is considered well known in the capacitor manufacturing art and is not a part of this invention.

Following formation of body 2, a layer of metallization 15 deposited at capacitor face 11 in a conventional manner. For example, the layer may be made by successively vacuum depositing chrome, copper and chrome or other substrate alloys entirely over face 11.

Once the metallization has been blanket deposited, face 11 is grooved. Grooves 17 may be formed, for example, by sawing furrows of desired width and depth at desired points in the surface. To accomplish this, a water-cooled abraisive wheel can be used.

After the grooves have been formed by sawing, the structure may be annealed to ameliorate damage caused by the action of the saw.

As an alternative to sawing, the grooves may be formed by ultrasonically abrating common face 11. In the case of ultrasonic abraision, an abraiding tool in the form of a comb whose teeth correspond to the location and dimension of the desired groove is positioned at common face 11 and ultrasonically driven while an abraisive slurry is supplied. Abraision is continued for a pre-determined time until a desired groove depth is obtained.

Subsequently, face 11 is provided with a solder dam in the form of a layer of insulating material, for example polyimide. The polyimide is applied to common face 11 so as to cover the surfaces of mesas 18A, B, C and grooves 17. The polyimide may be applied in any conventional manner as for example by spraying or dipping.

After the solder dam layer 14 is formed, it may be patterned using conventional masking and etching techniques to form cavities 15. Cavities 15 are located in layer 14 over buses 12A, B, C and formed with bases 16 at which the buses are exposed. Conventional lift off masking techniques as described by Franco et al in the above referenced patent may be used in combination with dry or wet etching to pattern the cavities. Thereafter, solder balls 13 are deposited in cavities 15 so as to contact buses 12A, B, C and extend above the upper surface of solder dam layer 14.

In the case of the embodiment shown in FIGS. 7a to c, grooves 17 mesas 18A, B, C and interconnect buses 12A, B, C are formed substantially as described in connection with the embodiment shown in FIG. 6a to b. Following formation of the grooves, mesas and interconnect buses, however, a lead frame 24 as described above is located at common face 11 and bonded to buses 12A, B, C respectively. Frame 24 may be bonded to buses 12A, B, C as for example by brazing of with a lead-tin solder of a melting point greater than that for solder balls 13. Once bonded, lead frame apron 24D as shown in FIG. 7b is trimmed so as to leave individual frame elements atop buses 12A, B, C. Apron 24D may be trimmed for example by shearing. Thereafter, conventional mask and etch techniques may be used to apply solder dam layers in the form of either a layer of insulation or a metallic layer atop frame elements 24A, B, C, respectively. Layers 14 are thereafter patterned in a conventional manner to form cavities 15 above lead frame elements 24A, B, C so as to have bases at which these segments are exposed. Following formation of the cavities 15, solder balls 13 are provided so as to contact lead frame elements 24A, B, C while extending above the upper surface of layer 14. Alternatively, the solder dam layer 14 may be formed atop frame 24 before the frame is mounted on the capacitor body. This approach has the advantage of lessening alignment and handling difficulties.

With regard to the embodiment shown in FIGS. 7a to g, a preferred method for its formation would be as follows. Following formation of the ceramic body, grooves 17 are formed at common face 11 in a manner as described in connection with the embodiments shown in FIGS. 5a to d and 6a to c, but, however, prior to blanket deposition of the metallization layer used to form buses 12A, B, C, as shown in FIG. 7a. Following formation of grooves 17 and resulting mesas 18A, B, C, a layer of first insulating material as for example silicon dioxide is formed over common face 11 so as to fill grooves 17 and cover mesa surfaces 20A, B, C. The first insulating layer may be formed of silicon dioxide by any suitable process as for example sputtering.

Following formation of first insulating layer 26, the layer is planarized, as for example, by ion milling or grinding to form the intermediate structure as shown in FIG. 7b. Thereafter, conventional masking and etching techniques are used to pattern insulating layer 26 so as to expose upper surfaces 20A, B, C of mesas 18A, B, C and their respective plate tab remnants 21A, B, C. The resulting structure would appear as shown in FIG. 7c. Thereafter, using conventional techniques, a layer of metallization as for example chrome, copper, chrome is deposited at the exposed surface 20A, B, C of respective mesas 18A, B, C to produce the intermediate structure as shown in FIG. 7b. Next, the upper surface of the structure is planarized again using a conventional process as for example electron milling or grinding to produce the intermediate structure as shown in FIG. 7e. Following formation of the intermediary structure as shown in FIG. 7e, a solder dam in the form of a second layer of insulating material 14 for example polyimide, is deposited. The polyimide or other insulating material used for the solder dam layer could be formed with conventional techniques resulting in the intermediate structure shown in FIG. 7e. Alternatively, a metallic solder dam could be used patterned to be confined to the top surface of the formed interconnect buses 12A, B, C. Finally, and as in the case of previously described structures, solder dam layer 14 would be patterned using conventional techniques to form cavities 15 having bases 16 at which the buses are exposed. Finally, solder balls 13 are deposited in cavities 15 so as to contact the interconnect buses and to extend above the upper surface of the solder dam layer as in previously described embodiments.

While specific embodiments and the preferred method for the making of this invention have been described, it will be appreciated by those skilled in the art that various modifications to the structure and process details may be made without departing from the spirit of the invention.

What I claim is:

1. In a capacitor structure having a ceramic body of particular length, width, and height the structure including multiple capacitor plates located at intervals displaced in the body in the direction of the body length, each plate having one or more tabs, the tabs being exposed at a common body face, the capacitor additionally having one or more buses for selectively electrically interconnecting the tabs such that the buses may be electrically interconnected to establish one or more capacitors of particular capacitance value and voltage rating, the improvement comprising providing grooves in the capacitor body at the common face to align the tabs in groups and to insure separation of the resulting tab groups.

2. The capacitor structure of claim 1 in which the plates are of two or more types, the types being defined at least by the number of tabs per plate, and the location of the tabs on the plate, the tabs of the respective type plates being displaced relative to one another in the direction of the body width, wherein the grooves are located in the common body face so as to align the tabs of similar type plates in the direction of the body length.

3. The capacitor structure of claim 2 wherein the grooves are additionally located in the common body face in the direction of the body width to separate the tabs of unlike type plates.

4. The capacitor structure of claim 3 wherein the grooves are located adjacent either side of the desired position of corresponding tabs of similar plate types, the grooves extending in the direction of the body length so as to define tab mesas containing at least portions of the corresponding tabs of like type plates.

5. The capacitor structure of claim 4 wherein the grooves define the lateral extent of corresponding tabs of like type plates.

6. The capacitor structure of claim 5 wherein the interconnect buses are individually located atop respective mesas in contact with the tabs remnants therein to electrically interconnect like type plates.

7. The capacitor structure of claim 6 wherein the width of the interconnect buses is co-extensive with the respective mesa widths.

8. The capacitor structure of claim 6 further including solder dam layers of covering at least a portion of respective buses.

9. The capacitor structure of claim 8 wherein the upper surface of the solder dam layers are substantially co-planar.

10. The capacitor structure of claim 9 wherein the respective solder dam layers include one or more cavities having bases at which the buses are exposed.

11. The capacitor structure of claim 10 wherein solder balls are provided within the cavities in contact with the respective buses which extend above the plane of upper surfaces of the respective solder dam layers.

12. The capacitor structure of claim 10 wherein the solder dam layers are layers of insulating material that extend between mesas to cover the common surface of the capacitor body defined by the surface of the grooves.

13. The capacitor structure of claim 6 further including a second metallic layer atop the respective interconnect buses, the second metallic layer extending laterally beyond the width of the respective mesa and interconnect bus.

14. The capacitor structure of claim 13 further including solder dam layers extending over the respective second metal layers, the solder dam layers being provided with one or more cavities therein having a base at which the second metallic layers are exposed, and wherein solder balls are located in the cavities in contact with the respective second metallic layers, the solder balls extending above the upper surface of the solder dam layers.

15. The capacitor structure of claim 6 wherein the grooves are filled with a first layer of insulation which extends to a height above the mesas and to a point coextensive with the height of the respective interconnect buses and wherein the interconnect buses extend laterally beyond the width of the mesas into the first insulation layer.

16. The capacitor structure of claim 15 wherein a solder dam layer of insulating material covers the first insulation layer and at least a portion of the interconnect buses, the solder dam layer including one or more cavities therein having a base at which the buses are exposed.

17. The capacitor structure of claim 16 wherein solder balls are provided in the cavities in contact with the respective buses which extend above the upper surface of the second insulating layer.

18. In a method for making a common face terminated multilayered ceramic capacitor structure, the method including forming multiple sections, each section including a ceramic dielectric of desired thickness upon which a metallic plate of one or more types is provided, the plates having multiple plate tabs whose number and location define the plate type; combining the sections to form a capacitor body of desired height, width, and length such that the tabs of the plate types are exposed at a common body face, the tabs of various plate types being alternately spaced in the direction of the body width and the plate types being alternately spaced in the direction of the body length; and applying a metalization pattern to form buses at the common termination face to interconnect corresponding tabs of like plate types, the improvement comprising blanket depositing a layer of metalization over the common face of the capacitor body; and thereafter forming grooves in the common face of the capacitor body so as to align the plate tabs and to form the interconnection buses.

19. The method of claim 18 wherein the grooves are formed to a desired width, length and depth by sawing the common face.

20. The method of claim 19 wherein the grooves are formed to a desired width, length and depth by ultrasonically abrading the common face.

21. The method of claim 19 wherein following formation of the capacitor body and before the common face is metallized, grooving the capacitor body; covering the common face with a first layer of insulation so as to fill the grooves; patterning the first insulating layer to expose the aligned plate tabs; metallizing the common face in the regions where the plate tabs have been exposed to form the interconnect buses; applying a solder dam layer of to the common face to cover the first insulation layer and the interconnection buses; patterning the solder dam layer to form cavities over the interconnect buses the cavities having bases at which the interconnect buses are exposed; and depositing solder balls in the cavities in contact with the interconnect buses so that the solder balls extend above the upper surface of the solder dam layer.

22. The method of claim 18 wherein following grooving and bus formation, a solder dam layer of insulating material is applied to cover the common termination face; thereafter patterning the solder dam layer with cavities located above the buses, the cavities having bases at which the buses are exposed and depositing solder balls in the cavities in contact with the buses, so that the solder balls extending above the upper surface of the solder dam layer.

23. The method of claim 18 wherein following grooving and bus formation bonding a slotted metallic lead frame to the interconnection buses; thereafter trimming the frame to form isolated frame sections bonded atop the respective interconnection buses.

24. The method of claim 23 wherein following formation of the isolated lead frame sections atop the respective interconnection buses, forming solder dam layers atop the upper surface of the lead frame sections; patterning the layers to include cavities having bases at which the isolated lead frame sections are exposed and depositing solder balls in the cavities in contact with the lead frame segments so that the solder balls extend above the upper surface of the solder dam layer.

* * * * *